US00RE45624E

(19) United States
(12) Reissued Patent
Eilmus et al.

(10) Patent Number: US RE45,624 E
(45) Date of Reissued Patent: Jul. 28, 2015

(54) SINK

(75) Inventors: Niels J. Eilmus, Sheboygan, WI (US); Terrence K. Mahon, Whitefish Bay, WI (US); Mary Reid, Sheboygan, WI (US)

(73) Assignee: KOHLER CO., Kohler, WI (US)

(21) Appl. No.: 29/421,144

(22) Filed: May 17, 2012

Related U.S. Patent Documents

Reissue of:
(64) Patent No.: Des. 627,864
Issued: Nov. 23, 2010
Appl. No.: 29/336,324
Filed: Apr. 30, 2009

(51) LOC (10) Cl. ..... 23-01
(52) U.S. Cl.
USPC ..... D23/290
(58) Field of Classification Search
USPC ..... D23/284, 286, 287, 290, 293.1, 303, D23/308, 272, 273, 274; 4/619, 639, 630, 4/631, 642
See application file for complete search history.

(56) References Cited

U.S. PATENT DOCUMENTS

| | | | | |
|---|---|---|---|---|
| D295,670 | S | 5/1988 | Reid et al. | |
| D307,964 | S | 5/1990 | Sauter et al. | |
| D314,612 | S | 2/1991 | Sauter et al. | |
| D319,687 | S | 9/1991 | Kohler, Jr. et al. | |
| D353,880 | S * | 12/1994 | Hauser, II | D23/290 |
| D395,699 | S | 6/1998 | Hundley | |
| D464,125 | S * | 10/2002 | Bayer et al. | D23/290 |
| D464,126 | S | 10/2002 | Bayer et al. | |
| D464,410 | S | 10/2002 | Paredes et al. | |
| D464,411 | S | 10/2002 | Bayer et al. | |
| D471,263 | S | 3/2003 | Bayer et al. | |
| D494,258 | S * | 8/2004 | Arnold | D23/290 |

(Continued)

OTHER PUBLICATIONS

Kohler Co. "Anthem Kitchen Sink". Model No. K-5840. Kohler Co. catalog.

(Continued)

*Primary Examiner* — Phillip S Hyder
(74) *Attorney, Agent, or Firm* — Foley & Lardner LLP

(57) CLAIM

The ornamental design for a sink, as shown and described.

DESCRIPTION

FIG. 1 is a right, top, front perspective view of a sink embodying our new design;
FIG. 2 is a top plan view thereof;
FIG. 3 is a front elevational view thereof;
FIG. 4 is a right side elevational view thereof, the left side [elevational] *elevation* view [There of] *thereof* being a mirror image of the right side shown;
FIG. 5 is a rear elevational view thereof; and,
FIG. 6 is a bottom plan view thereof.
The broken line representations in the figures are for the purpose of illustration only, and form no part of the claimed design.
In a preferred embodiment, the nature of this product is as a plumbing fixture in the form of a sink which is primarily useful for washing various items.

1 Claim, 4 Drawing Sheets

Figure 3:
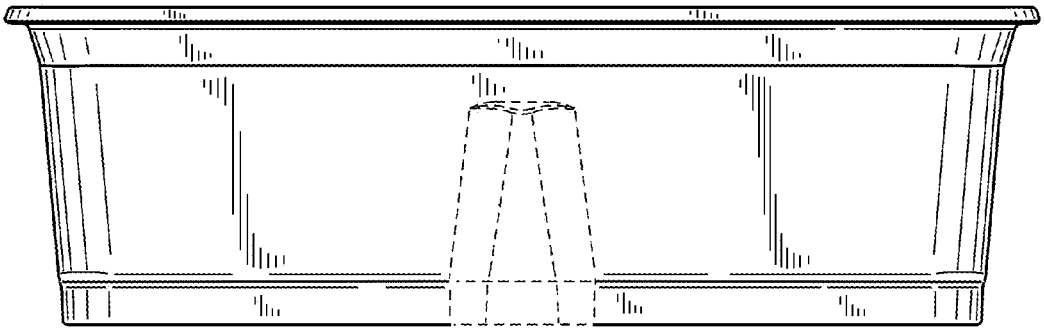
Figure 4:
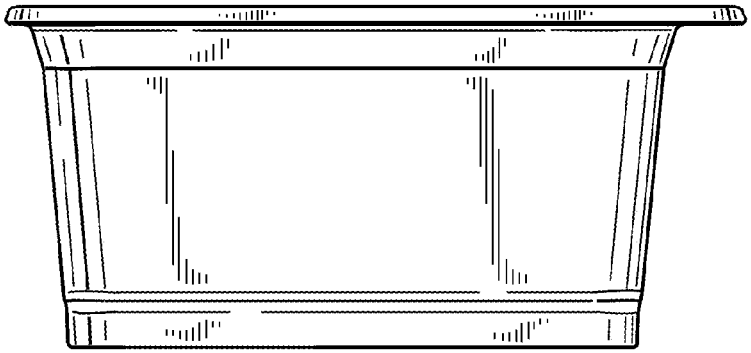
Figure 5:
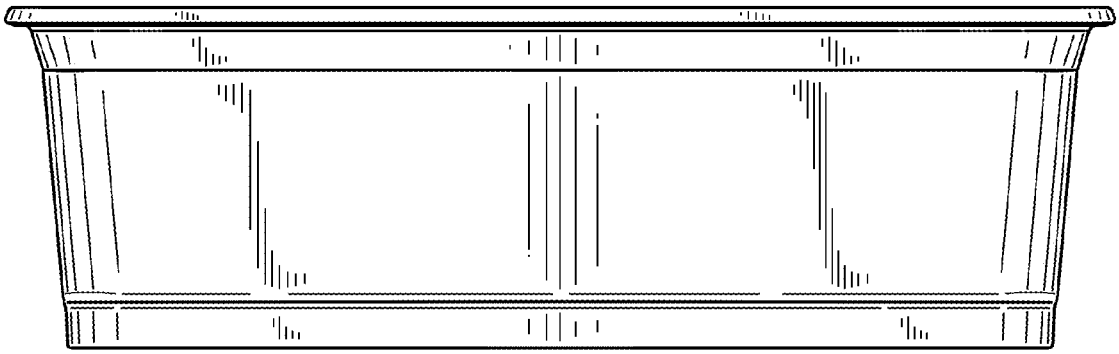

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D518,561 | S | | 4/2006 | Gordon | |
| D526,056 | S | * | 8/2006 | Arnold | D23/290 |
| D526,393 | S | | 8/2006 | Blomstrom | |
| D547,833 | S | * | 7/2007 | Mahon | D23/290 |
| D570,459 | S | | 6/2008 | Kitzmiller | |
| D570,460 | S | | 6/2008 | Kitzmiller | |
| D570,968 | S | | 6/2008 | Kitzmiller | |
| D570,969 | S | | 6/2008 | Kitzmiller | |
| D586,445 | S | * | 2/2009 | Ziemann et al. | D23/290 |
| D601,675 | S | * | 10/2009 | Booth et al. | D23/290 |
| D610,659 | S | * | 2/2010 | Booth | D23/290 |
| D645,549 | S | | 9/2011 | Booth | |

OTHER PUBLICATIONS

Kohler Co. "Langlade Smart Divide Kitchen Sink". Model No. K-6626. Kohler Co. catalog.

Kohler Co. "Poise Double Equal Undercouner Kitchen Sink". Model No. K-3159. Kohler Co. online catalog. Copyright 2009 Kohler Co.

Kohler Co. "Entertainer Entertainment Sink". Model No. K-6558. Kohler Co. catalog.

* cited by examiner

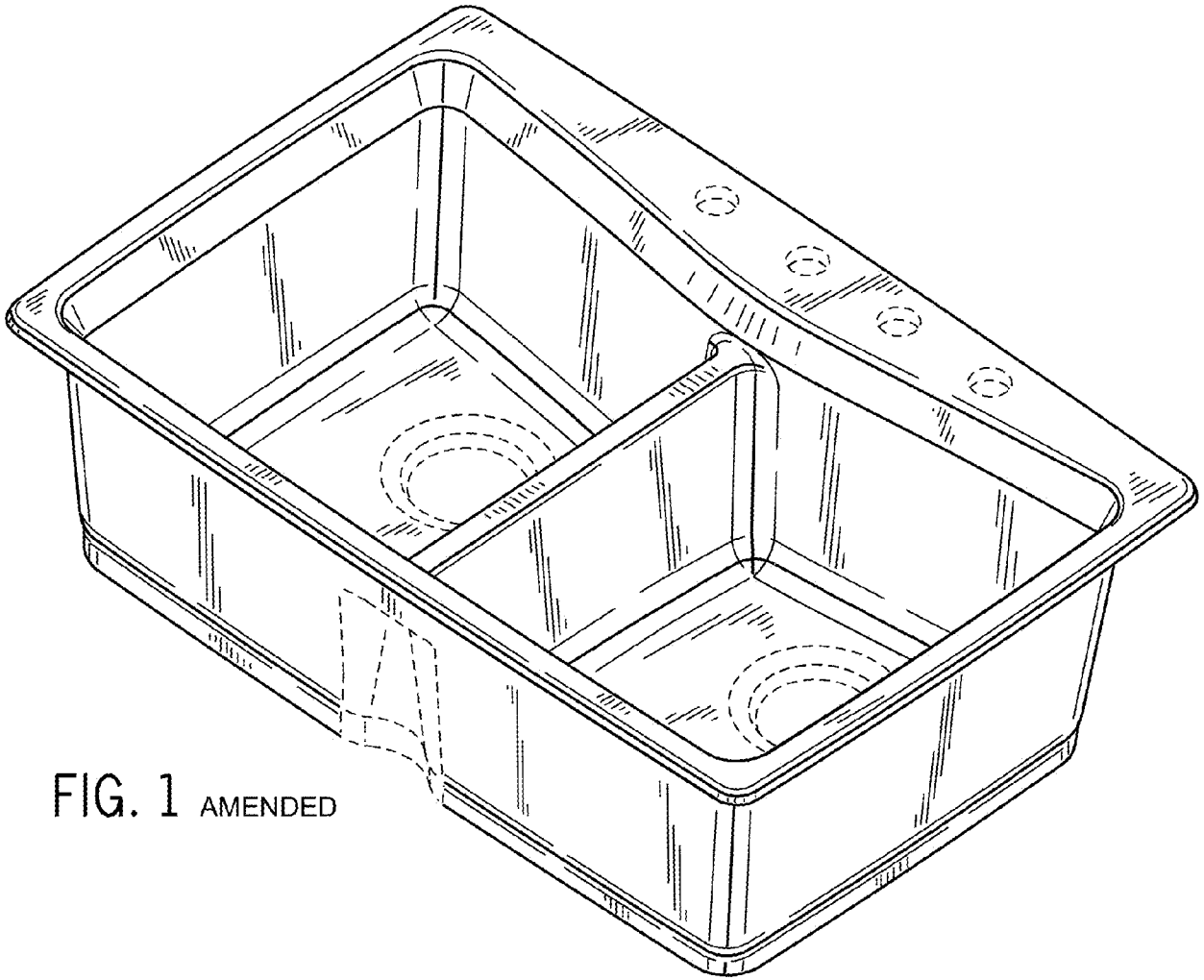
FIG. 1 AMENDED

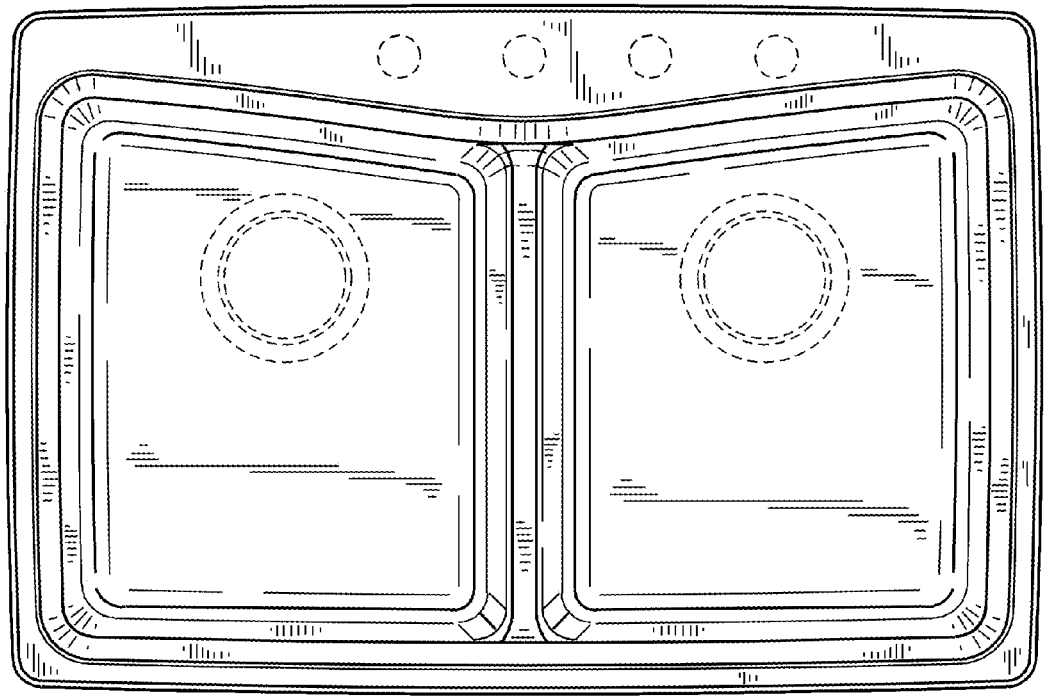
FIG. 2 AMENDED

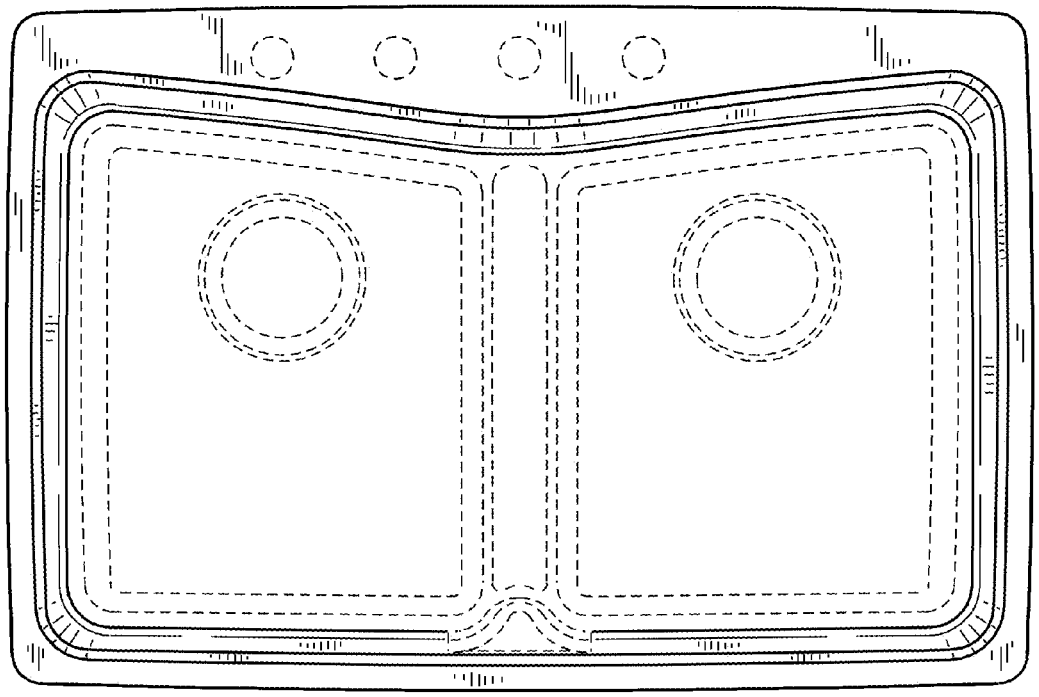
FIG. 6 AMENDED